(12) United States Patent
Harada et al.

(10) Patent No.: US 7,665,857 B2
(45) Date of Patent: Feb. 23, 2010

(54) ILLUMINATION DEVICE FOR AN INDICATING NEEDLE

(75) Inventors: Takeshi Harada, Shizuoka (JP);
Masayuki Ogawa, Shizuoka (JP);
Yoshiyuki Furuya, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 12/314,557

(22) Filed: Dec. 12, 2008

(65) Prior Publication Data
US 2009/0154136 A1    Jun. 18, 2009

(30) Foreign Application Priority Data
Dec. 12, 2007  (JP)  ............................. 2007-320549

(51) Int. Cl.
*G01D 11/28*  (2006.01)
(52) U.S. Cl. .............................. 362/23; 362/26; 362/27; 116/288; 116/303
(58) Field of Classification Search ............... 362/23, 362/26, 30; 116/288, 303
See application file for complete search history.

(56) References Cited

U.S. PATENT DOCUMENTS

| | | | | | |
|---|---|---|---|---|---|
| 6,302,551 | B1 * | 10/2001 | Matumoto | ................... | 362/27 |
| 6,461,006 | B1 * | 10/2002 | Matumoto | ................... | 362/27 |
| 6,714,126 | B2 * | 3/2004 | Wada | ......................... | 340/438 |
| 7,357,096 | B2 * | 4/2008 | Tane | ......................... | 116/288 |

* cited by examiner

*Primary Examiner*—Hargobind S Sawhney
(74) *Attorney, Agent, or Firm*—Edwards Angell Palmer & Dodge LLP

(57) ABSTRACT

An illumination device for an indicating needle includes a plurality of light sources, an indicating needle, a guiding member, and a luminance control unit. The indicating needle includes a needle body and a needle base. The base has an entrance surface and a reflection surface. A luminance control unit controls luminance of the light sources in response to turning of the indicating needle such that the luminance is lowest when a light emitted perpendicularly from a center of an emitting surface of the light source is reflected off a reflection surface's region which a longitudinal central line of the needle body intersects with, and that the luminance gradually increases as the light emitted by the light source from the center of the emitting surface thereof is reflected off a region that is more distant from the region which the longitudinal central line of the needle body intersects with.

3 Claims, 9 Drawing Sheets

ILLUMINATION DEVICE FOR AN INDICATING NEEDLE

CROSS REFERENCE TO RELATED APPLICATION

The priority application Japanese Patent Application No. 2007-320549 upon which the present patent application is based is hereby incorporated by reference.

BACKGROUND OF THE INVENTION

1. Field of the Invention

The present invention generally relates to an illumination device for an indicating needle. More particularly, the present invention relates to an illumination device for an indicating needle that includes (a) an indicating needle that has a needle body framed in a shape of a rod and configured to point indications, and a needle base having a reflection surface configured to reflect a light entering an inside of the needle base via an entrance surface thereof toward a pointed end (or a tip) of the needle body, a width of the needle base being wider than that of the needle body, and (b) light sources that are arranged around a driving shaft of the indicating needle and each configured to emit the light that enters the inside of the indicating needle via the entrance surface thereof.

2. Description of the Related Art

Currently, combination meters for an automobile, which includes for example a speedometer, a tachometer, and a fuel gauge, have an indicating needle that has illumination features for evening/nighttime driving and/or self-luminescence features. In general, illumination functionality of such automotive meters is used to ensure and improve visibility of the meters in the nighttime as well as in the daytime. FIG. 10A illustrates a known illumination device 1 that has such illumination functionality for the indicating needle. As illustrated in FIG. 10A, the illumination device 1 has an indicating needle 2 and a plurality (three in the figure) of light sources 3.

The indicating needle 2 includes a needle body 6 and a needle base 7. The needle body 6 is formed in a rod shape and configured to point indications provided for example on a speedometer dial. The needle base 7 has an entrance surface M3 and a reflection surface M2.

The entrance surface M3 is provided on a bottom surface of the needle base 7. A light ray L emitted by the light source 3 enters an inside of the indicating needle 2 via the entrance surface M3. The reflection surface M2 is provided on an upper surface of the needle base 7. The reflection surface M2 is tapered such that a height of the needle base 7 increases toward the tip of the needle body 6. The reflection surface M2 is configured to reflect the light L coming in via the entrance surface M3 of the needle base 7 toward the tip (or a pointed end) of the needle body 6.

As illustrated in FIG. 10B, a width of the needle base 7 is wider than that of the needle body 6. The light sources 3 are arranged such that they encircles a driving shaft of the indicating needle 2 and configured to emit the light L that enters inside of the indicating needle 2 via the entrance surface M3.

The light L emitted by the light source 3 enters the inside of the indicating needle 2 via the entrance surface M3. The light L coming in via the entrance surface M3 of the indicating needle 2 is reflected off the reflection surface M2 toward the pointed end of the needle body 6. The light reflected by the reflection surface M2 is further reflected on an injection-molded layer 8 of the needle body 6 toward an upper surface of the needle body 6. The layer 8 is for example formed by hot stamping or provided with fine prisms. In this manner, the upper surface of the needle body 6 is illuminated.

Japanese Patent Application Laid-Open Publication No. 2004-294344 discloses known illumination devices of a kind that have a light-guiding member configured to guide the light L emitted by the light source 3 to the entrance surface M3 of the indicating needle 2.

Such conventional illumination devices have drawbacks. In general, the light sources 3 have a predetermined intensity distribution of its outgoing light. If the light source 3 shows lambertian or near lambertian distribution, for example in a case of a white LED, then the intensity of the outgoing light L is largest when the light is emitted along a vertical line P1 normal to the surface of the light source 3 and extending from the center of the light source 3 and the intensity gradually decreases as an angle of the outgoing light L becomes wider with respect to the vertical line P1. Also, since the driving shaft of the indicating needle 2 is encircled by a plurality of the light sources 3, the light L coming in via the entrance surface M3 into the indicating needle 2 may exhibit irregularity in luminance in a circumferential direction about the driving shaft.

Also, as illustrated in FIG. 10B, the width of the needle base 7 of the conventional illumination device 1 is wider than that of the needle body 6 due to design requirement; The needle body 6 may have to be as finely pointed as possible for external appearance quality, or a weight of the indicating needle 2 may have to be limited in view of effective operation of a driving motor that turns the indicating needle.

Accordingly, when guiding the light rays L from the light source 3 to the needle body 6, the irregularity of illumination occurs depending upon at which exact point on the reflection surface M2 the light ray L is reflected. In some regions, the traveling light L is affected by a loss caused by reflection because the light L in part goes outside of the indicating needle 2 in the course of traveling, whereas, in other regions, the traveling light L would not be seriously affected by such losses.

FIGS. 11A and 11B highlight these drawbacks. As illustrated in FIG. 11A, the light L reflected off a region A of the reflection surface M2, which is directly opposite the indicating needle 2 and is indicated by a dotted line, can be guided toward the needle body 6 without being seriously affected by the above-mentioned loss. However, as illustrated in FIG. 11B, the light reflected off regions B of the reflection surface M2, which extend on both sides of the region A and are indicated by an alternate long and short dash line, is guided toward the pointed end of the needle body 6 over multiple reflections off the both sides of the needle body 6. Understandably, larger losses will result due to the increased number of times of reflection.

As has been explained above, the light rays L emitted by the light sources 3 of the indicating needle 2 and introduced inside of the indicating needle 2 via the entrance surface M3, are subject to strong irregularities in intensity. Consequently, the amount of the light coming in on the negligibly affected region A varies when the indicating needle 2 turns. Thus, the conventional illumination device 1 is affected by variation in brightness depending upon the turning of the indicating needle 2, as long as the light sources 3 are all controlled to be at a uniform level of luminance.

SUMMARY OF THE INVENTION

In view of the above-identified drawbacks, the purpose of the present invention is to provide an illumination device for an indicating needle that can reduce variations in brightness of the indicating needle when the indicating needle turns and achieve improved visibility of illumination and improved quality of external appearance.

In order to attain the above object, the illumination device for an indicating needle according to one embodiment of the present invention has (A) an indicating needle that includes (a) a needle body, in a shape of a rod, configured to indicate an indication and (b) a needle base whose width is larger than a width of the needle body, the needle base having (i) an entrance surface via which a light enters an inside of the needle base and (ii) a reflection surface by which the light entering the inside of the needle base via the entrance surface is reflected toward the needle body; (B) a plurality of light sources each configured to emit the light entering the inside of the needle base via the entrance surface thereof and arranged such that the light sources encircles a driving shaft of the indicating needle; and (C) a luminance control unit that controls luminance of the plurality of light sources in response to turning of the indicating needle such that (a) the luminance is lowest when the light emitted by the light source from a center of an emitting surface thereof is reflected off a region of the reflection surface that a longitudinal central line of the needle body intersects, and (b) the luminance becomes higher when a point of reflection, which is found on the reflection surface, of the light emitted by the light source from the center of the emitting surface thereof becomes more distant from the region of the reflection surface that the longitudinal central line of the needle body intersects.

Preferably, the illumination device for an indicating needle according to the one embodiment of the present invention further includes a light-guiding member disposed between the indicating needle and the light sources, formed in a shape of an inverted cup whose radius is largest on the side of the light source and gradually decreases toward the side of the indicating needle, and configured to guide the light emitted by the light sources toward the entrance surface of the needle base.

With the above construction and arrangement, the luminance control unit controls the luminance of the light sources in response to the turning of the indicating needle such that the luminance is lowest when the light emitted along the axis of the light source is reflected at the region of the reflection surface which the longitudinal central line of the needle body intersects with, and the luminance becomes larger as the position of reflection of the light from the axis of the light source on the reflection surface moves away from the region of the reflection surface which the above-defined longitudinal central line intersects with. Accordingly, the amount of light emitted by the light source and incident on a region that is not seriously affected by losses can be made constant during travel to the needle body via the reflection surface even when the indicating needle turns, thus reducing the variations in brightness of the needle body while turning and ensuring improved visibility and external appearance.

BRIEF DESCRIPTION OF THE DRAWINGS

These and other objects, features, and advantages of the present invention will become more apparent upon reading of the following detailed description along with the accompanied drawings, in which.

DESCRIPTION OF THE PREFERRED EMBODIMENT

Figure 1:
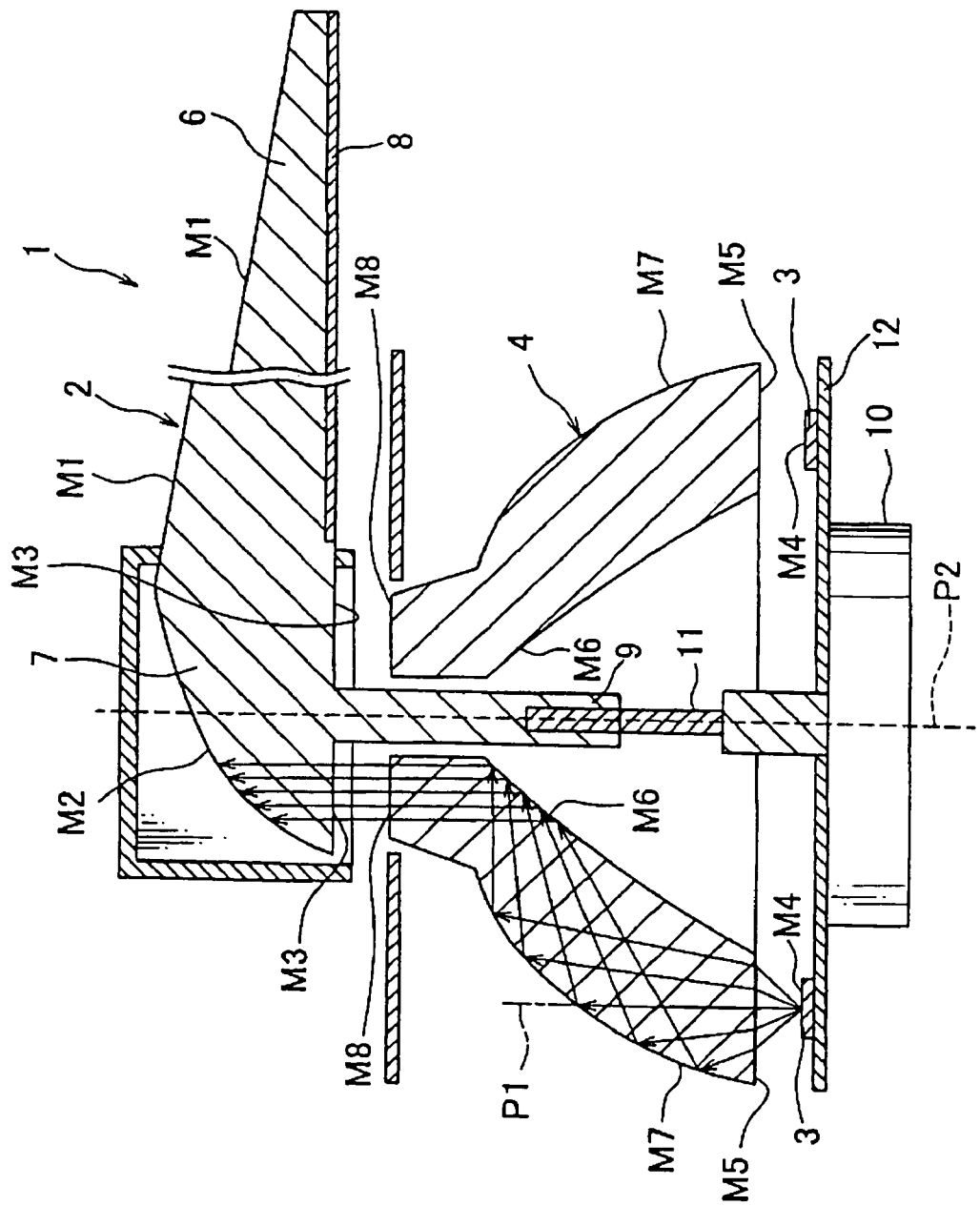
FIG. 1 is a cross-sectional view of an illumination device for an indicating needle according to one embodiment of the present invention.

An illumination device 1 for an indicating needle according to one embodiment of the present invention is described below with reference to the attached drawings. Referring to FIG. 1, the illumination device 1 includes an indicating needle 2, a light source 3, a light-guiding member 4, and an illumination device controller 5 (see FIG. 4).

The indicating needle 2 is made of optically transparent resin such as polymethylmethacrylate (PMMA) and polycarbonate (PC). The indicating needle 2 includes a needle body 6 and a needle base 7.

The needle body 6 is formed in a shape of a rod that points an indication provided for example upon a speedometer dial or a tachometer dial. A reflection surface M1 is provided on a front surface of the needle body 6. An injection-molded layer 8 is provided on a rear surface of the needle body 6. Note that the front surface is a portion that a driver who takes a driver's seat can see while driving, and the rear surface a portion that in normal cases cannot be seen by the driver.

The reflection surface M1 is tapered such that a thickness of the needle body 6 in a vertical direction gradually decreases toward a pointed end, which may be referred to as "tip," of the needle body 6, with the reflection surface M1 sloping downward and with the rear side of the needle body 6 remains horizontal to a surface of the speedometer or tachometer dial. Note that the reflection surface M1 may be simply referred to as "M1 surface" for convenience of explanation.

The injection-molded layer 8 may be a white hot-stamp layer with high reflectance or a layer provided with fine prisms.

The needle base 7 has a reflection surface M2, an entrance surface M3, and a bearing 9.

The reflection surface M2 is provided on a front surface of the needle base 7, or more specifically, on a curved portion of the front surface of the needle base 7. The reflection surface M3 is tapered such that a thickness of the needle base 7 gradually increases toward the end of the needle body 6. Note that the reflection surface M2 may be simply referred to as "M2 surface."

The entrance surface M3 is provided on a rear side of the needle base 7. The entrance surface M3 is arranged opposed to the M2 surface in a direction of an axis P2 of a driving shaft 11. The entrance surface M3 extends on a plane normal to the axis P2. Note that the entrance surface M3 may be simply referred to as "M3 entrance" in this specification.

As illustrated in FIGS. 5 to 8, a width of the rear-side of the needle base 7 is wider than that of the needle body 6, and the width of the needle base 7 gradually decreases toward the needle body 6 and finally becomes equal to that of the needle body 6. Accordingly, a region A of the M2 surface indicated by a dotted line, which is immediately opposed to a cross section of the indicating needle 2 is a region where the light rays L emitted by the light source 3 can be guided to the needle body 6 without serious losses in intensity. Also, a region B of the M2 surface on both sides of the region A is indicated by an alternate long and short dash line. The region B is a portion where larger losses in intensity occur when the light rays L emitted by the light source 3 are guided to the needle body 6.

Referring again to FIG. 1, the bearing 9 protrudes downward from the rear surface of the body 7 at the center of the M3 entrance. The bearing 9 is secured to the driving shaft 11 of a driving motor 10. Thus, the indicating needle 2 is configured to pivot about the bearing 9. The motor 10 is provided on a rear surface of a circuit board 12. The driving shaft 11 of the motor 10 protrudes on a front surface of the circuit board 12.

A plurality of the light sources 3 are arranged on the circuit board 12 such that they encircles the driving shaft 12 board 12, i.e., a driving shaft of the indicating needle 2. In this embodiment, three light sources 3 are lo provided on a circle with the driving shaft 11 being its center. The three light sources 3 are at equal spaces with respect to each other such that any two neighboring light sources 3 make an angle of 120 degrees. Each of the light sources 3 is provided upon the circuit board 12 such that a vertical line P1, which is normal to a light emitting surface M4 of the light source 3 and extends from the center portion of the light emitting surface M4, is parallel to the axis P2 of the driving shaft 11. The light source 3 emits the light rays L from the light emitting surface M4 radially of the center of emission. The light source 3 has an intensity distribution according to which an intensity of the light ray L that is output along the vertical line P1 is the highest, and the intensity of the light ray L becomes lower as an output angle of the light ray L measured with respect to the vertical line P1 becomes wider.

Figure 2A:
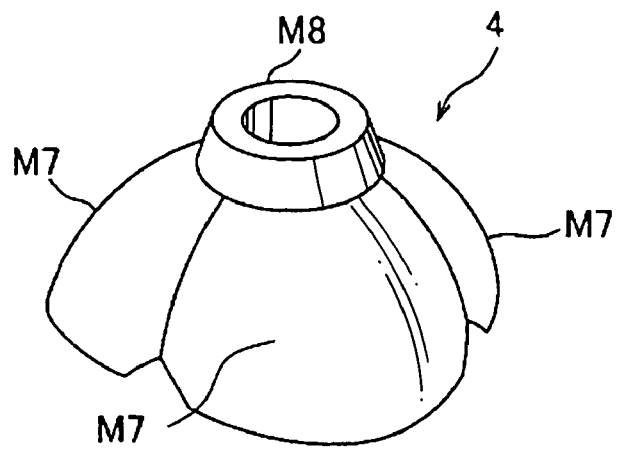
FIG. 2A is a perspective view of a light-guiding member of the illumination device illustrated in FIG. 1.
Figure 2B:
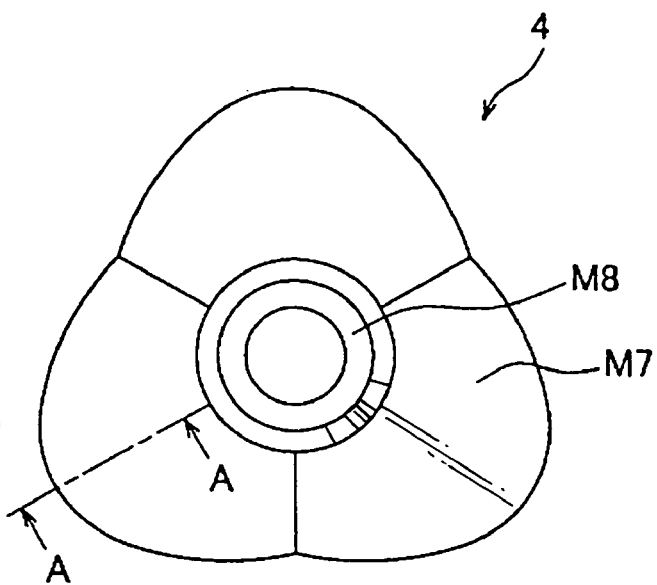
FIG. 2B is a front elevation of the light-guiding member of the illumination device illustrated in FIG. 1.
Figure 2C:
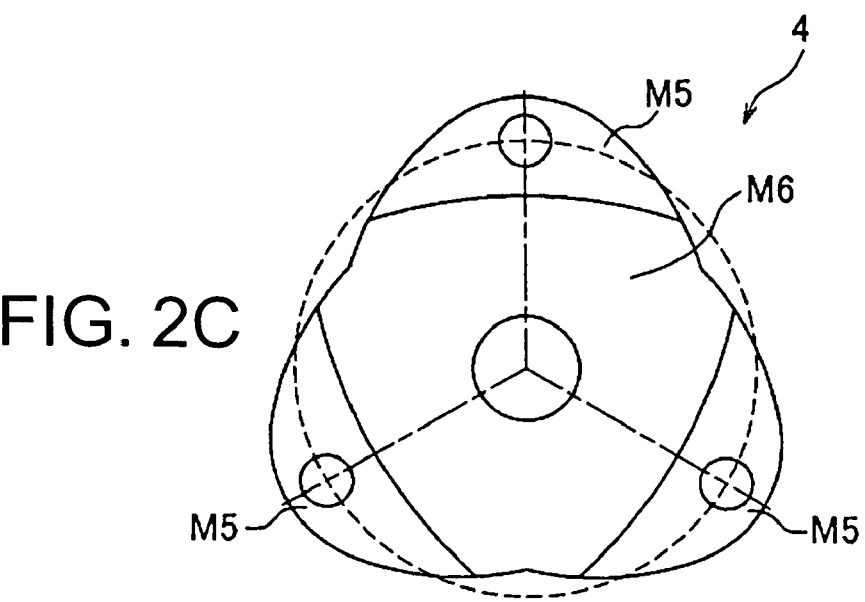
FIG. 2C is a rear elevation of the light-guiding member of the illumination device illustrated in FIG. 1.
Figure 3:
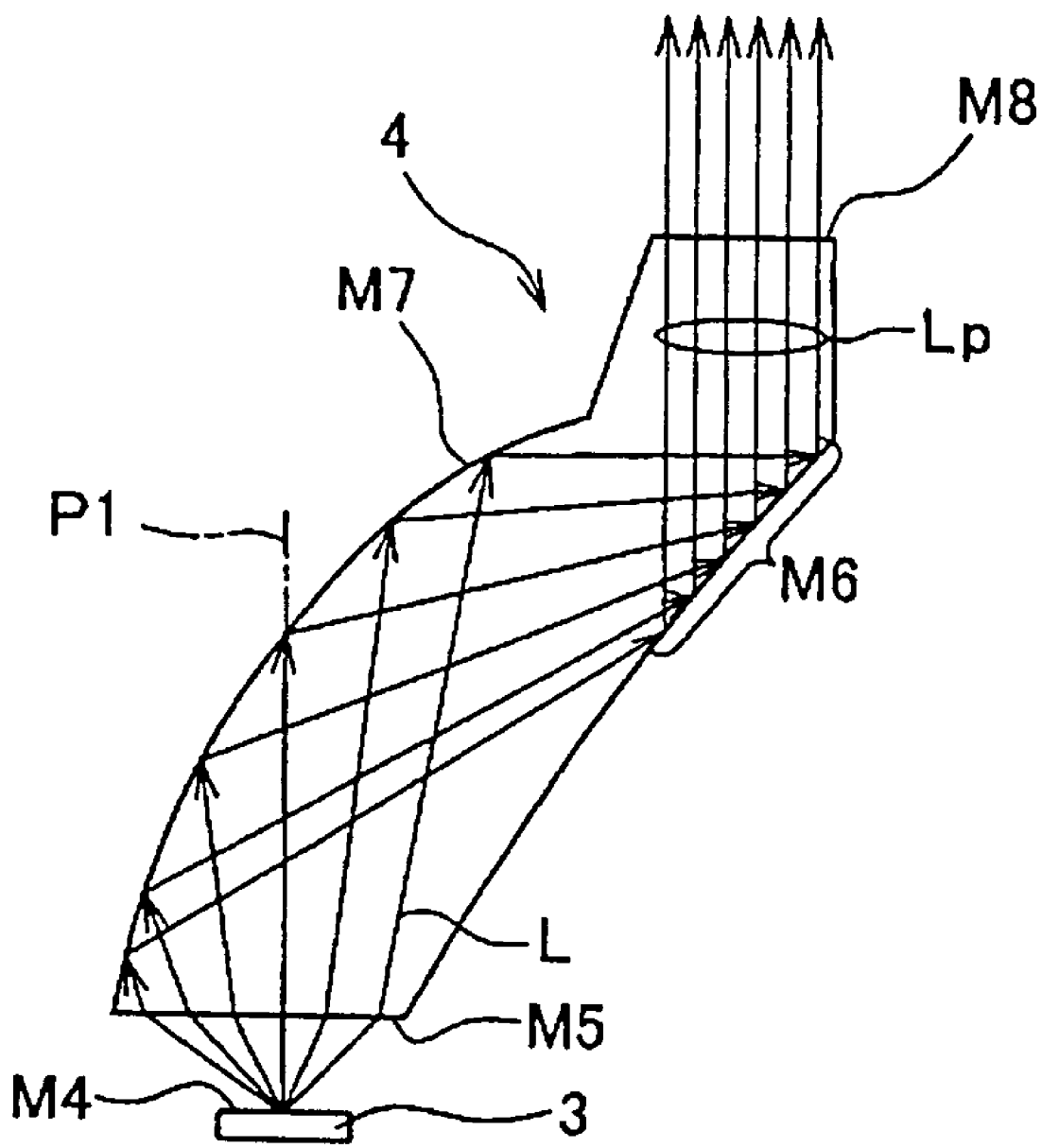
FIG. 3 is a cross-sectional view taken along line A-A of FIG. 2B.

The light-guiding member 4 is made of optically transparent resin such as PMMA and PC. The light-guiding member 4 is configured to guide the light rays L emitted by the light source 3 to the M3 entrance of the indicating needle 2. As illustrated in FIGS. 1 to 3, the light-guiding member 4 is formed in a shape of an inverted cup, i.e., in an approximately cylindrical shape whose radius is largest on the side of the light source 3 and gradually decreases toward the rear surface of the needle base 7.

The light-guiding member 4 has an entrance surface M5 (or simply called "M5 entrance"), a first reflection surface M6 (or simply called "M6 surface") extending around the driving shaft 11, a second reflection surface M7 (or simply called "M7 surface) provided radially outward of the entrance surface M5, and an exit surface M8 (or simply called "M8 exit").

The entrance surface M5 is opposed to the light emitting surface M4 lo of the light source 3, and is on a plane normal to the vertical line P1 of the light source 3. The second reflection surface M7 is provided on an outer surface of the light-guiding member 4. The second reflection surface M7 has a curved shape such that the light rays L emitted by the light source 3 is reflected off the M7 surface, concentrated, and guided to the first reflection surface M6.

The first reflection surface M6 is provided on an inner surface of the light-guiding member 4 and is opposed to the M3 entrance of the needle body 7 in a direction of the axis P2. The first reflection surface M6 has a curved shape configured to further reflect the lights L that were reflected off the M7 surface and convert the light rays L into approximately parallel light rays Lp (see FIG. 3).

Figure 5:
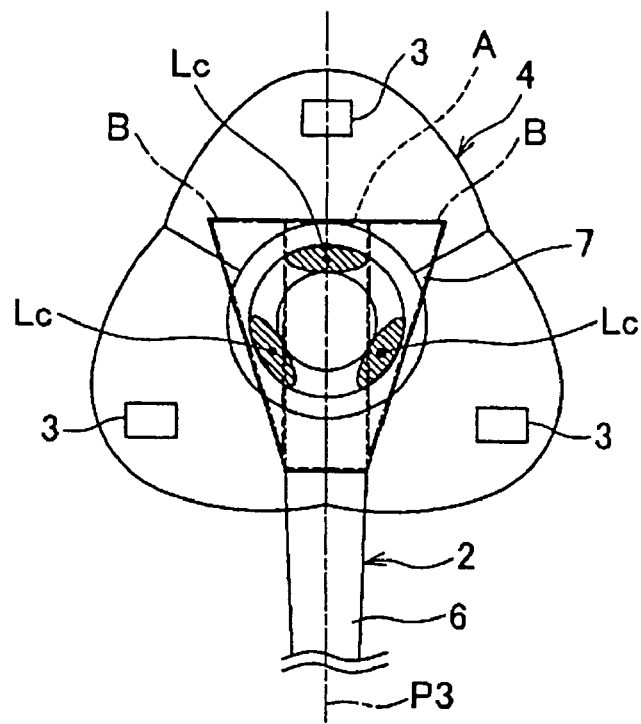
FIG. 5 is an explanatory view of luminance control performed by an illumination device controller illustrated in FIG. 4.

The exit surface M8 extends on a plane normal to the axis P2. The M8 exit has a circular shape on the above plane. As illustrated in FIG. 5, a bundle of the light rays L, which have high intensity and travel out of the M8 exit, has an elliptic cross section with the central light ray Lc emitted along the vertical line P1 of the light source 3 being the center of the ellipse. The intensity of the light rays L is gradually reduced as the light rays L become distant from a high-intensity region C indicated as a shaded area shown in FIG. 5.

Figure 4:
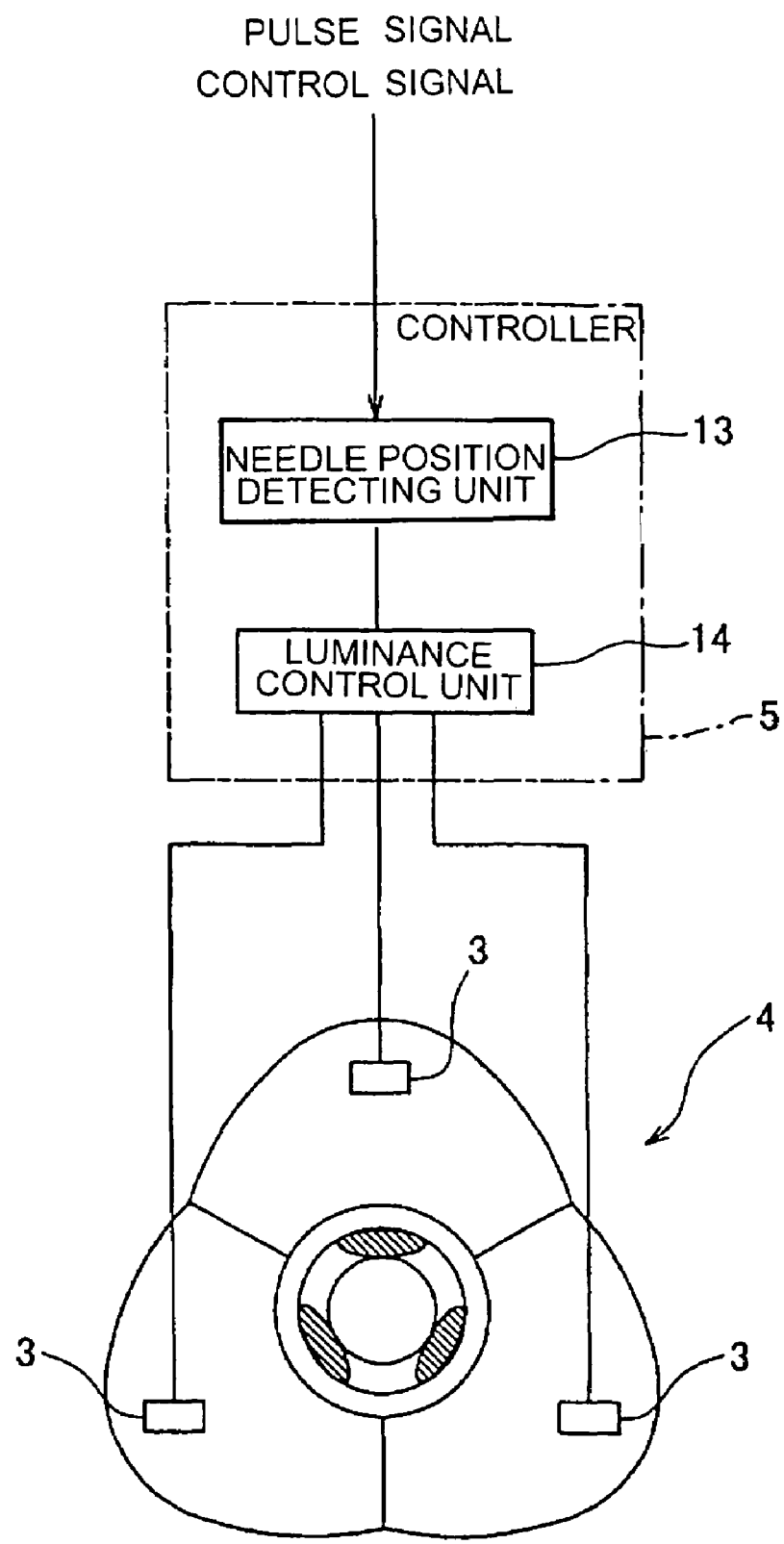
FIG. 4 schematically illustrates a circuit configuration of the illumination device for an indicating needle according to the embodiment of the present invention.

As illustrated in FIG. 4, the illumination device controller 5 includes a central processing unit (not shown), a needle position detecting unit 13 and a luminance control unit 14. The needle position detecting unit 13 detects a position of the indicating needle 2 on the basis of a pulse signal indicative of a vehicle speed, which is sent from a speed sensor (not shown), and a motor control signal for driving the needle, which is sent from a motor control unit (not shown).

The luminance control unit 14 controls luminance of the light sources 3 by controlling a duty ratio of a pulsed power supply that supplies power to the light sources 3. The luminance control unit 14 controls the luminance of the light sources 3 depending upon an actual position of the indicating needle 2 detected by the needle position detecting unit 13. As will be described in detail later, the luminance control unit 14 performs the luminance control under which the following two requirements remain to be met. First, the luminance of the light L is lowest when the light ray L emitted by the light source 3 along the vertical line P1 of the light source 3 is reflected off a region of the reflection surface M2 that the longitudinal central line P3 of the needle body 6 intersects. Second, the luminance of the light ray L emitted along the vertical line P1 gradually increases as a position of reflection of the light ray L on the M2 surface moves away from the region of the reflection surface M2 that the longitudinal central line P3 of the needle body 6 intersects.

The following describes how the light rays L emitted by the light source 3 travel. Referring to FIG. 3, the light source 3 emits the light rays L from the light emitting surface M4, and radially with the vertical line P1 of the light source 3 being the center of emission. The radially emitted light rays L enter the inside of the light-guiding member 4 via the entrance surface M5 of the light-guiding member 4.

The light rays L that entered the light-guiding member 4 is reflected by and concentrated by the second reflection surface M7, and then guided to the first reflection surface M6. The light rays L that reached the M6 surface are reflected off the M6 surface and then become approximately lo parallel light rays Lp that travel along a direction parallel to the axis P2 of the driving shaft 11.

After that, the approximately parallel light rays Lp travel in a ringwise fashion out of the light-guiding member 4 via the exit surface M8 thereof and enter an inside of the indicating needle 2 via the M3 entrance. As illustrated in FIG. 1, the light rays L that traveled through the light-guiding member 4 further enter the inside of the needle base 7 via the M3 entrance. The light rays L that reached the M2 surface are then reflected off the M2 surface toward the pointed end of the indicating needle 2. The light rays L that have been reflected toward the pointed end are further reflected by the M1 surface toward the injection-molded layer 8. Finally, the light rays L that have been reflected off the injection-molded layer 8 passes through the reflection surface M1, so that they reach driver's eyes and the driver will recognize that the front side of the needle body 6 is illuminated.

Figure 9:
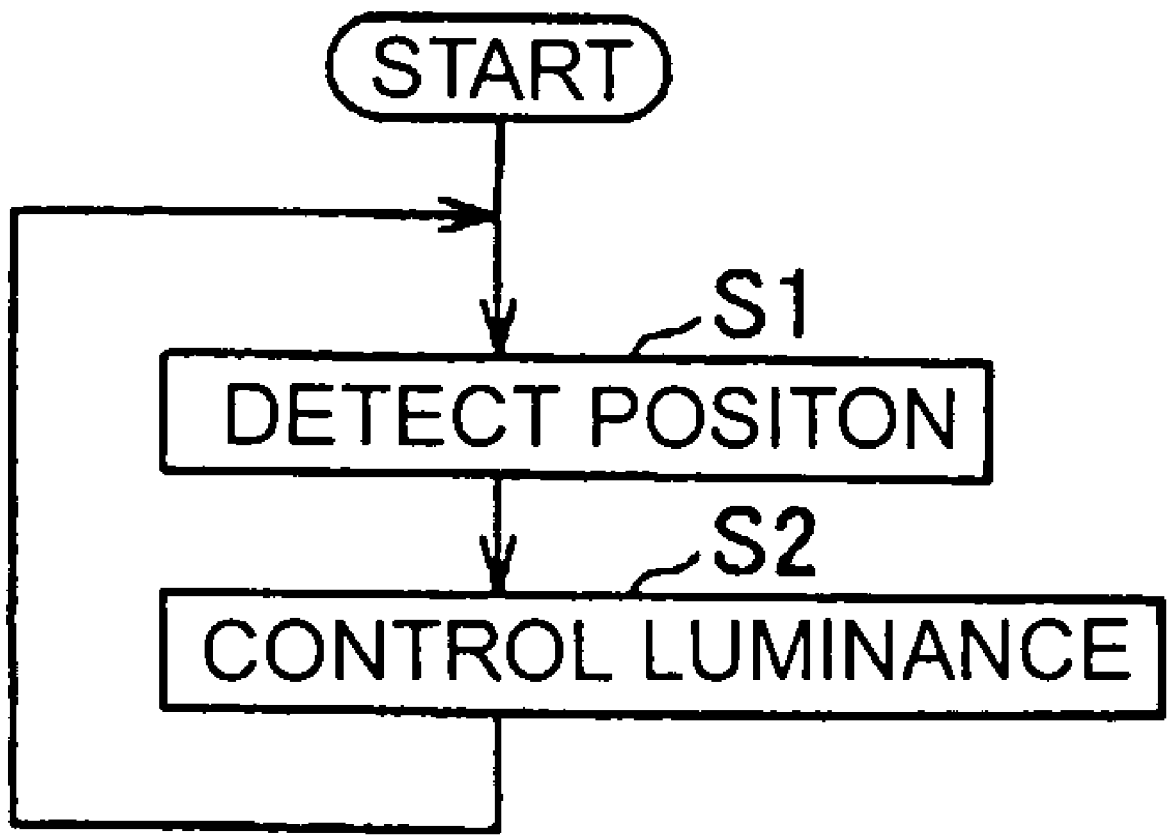
FIG. 9 is a flowchart describing a routine for detecting a position of an indicating needle and controlling luminance of a light source, which is performed by the illumination device controller illustrated in FIG. 4.
Figure 10A:
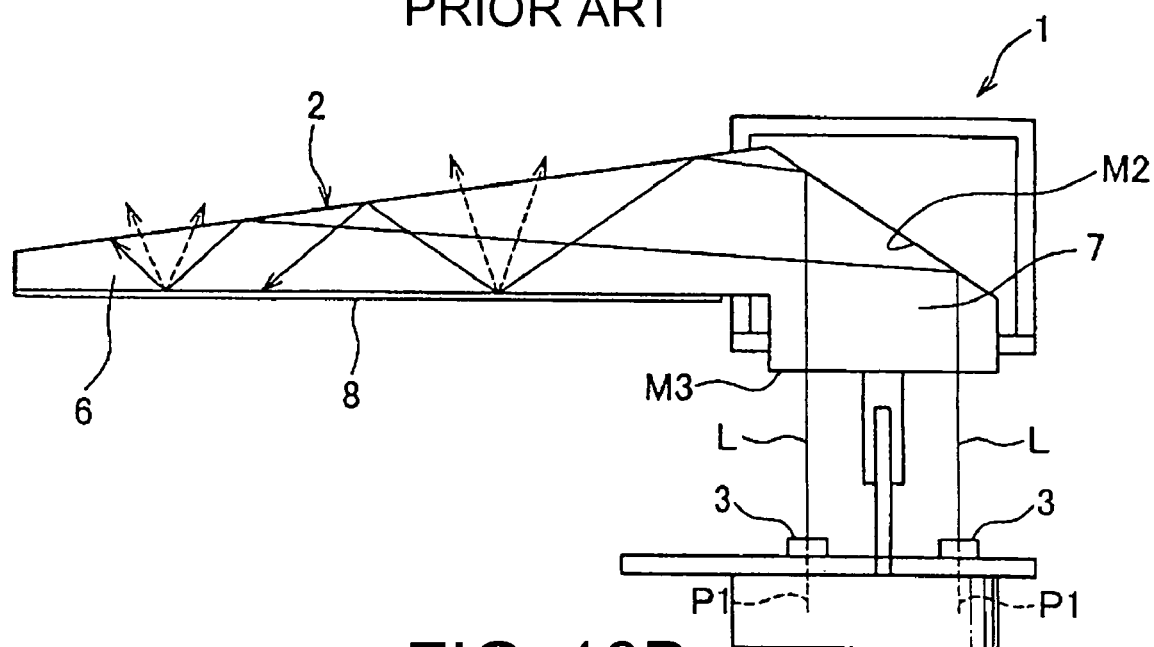
FIGS. 10A and 10B illustrate a conventional illumination device for an indicating needle.
Figure 10B:
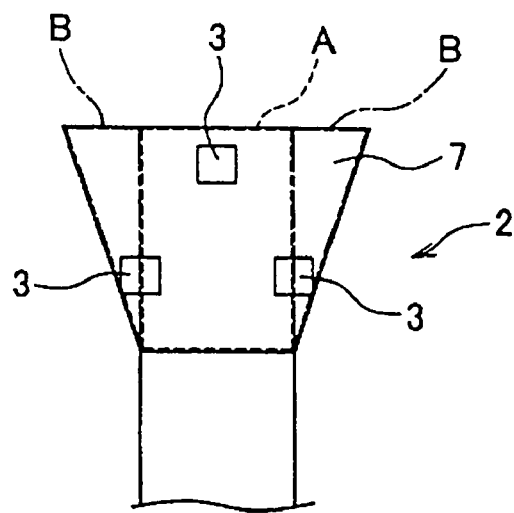
Figure 11A:
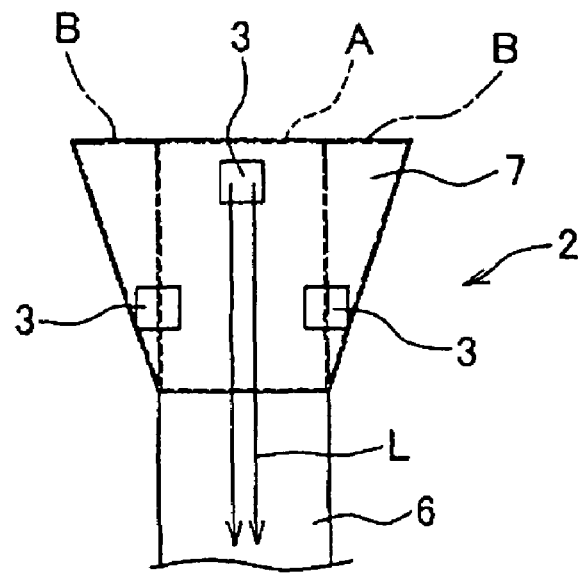
FIGS. 11A and 11B emphatically illustrate problems found in the conventional illumination device illustrated in FIGS. 10A and 10B.
Figure 11B:
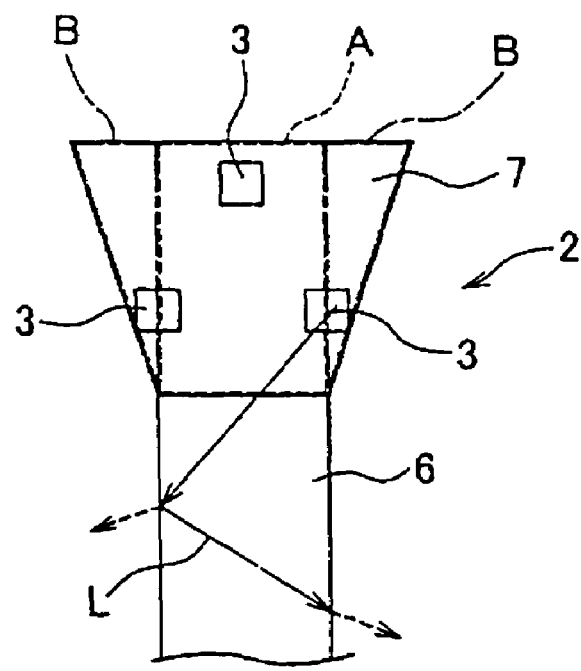

The following describes the operation of the illumination device 1 with reference to FIG. 9. First, the illumination device controller 5 is activated when an ignition switch of an automobile has been turned on. In a position detection step (step S1), the needle position detecting unit 13 of the illumination device controller 5 detects the position of the indicating needle 2 on the basis of information including the pulse signal indicative of the vehicle speed sent from the speed sensor (not shown), and the motor control signal for driving the indicating needle, which is output by the motor control unit (not shown).

Next, in a luminance control step (step 2), the luminance control unit 14 of the illumination device controller 5 controls the duty of the pulsed power supply to the light source 3 in accordance with a luminance pattern lo that takes into consideration the actual position of the indicating needle 2 that is detected in step S1, and thereby controls the luminance of the light sources 3, and then the process goes back to step S1. The illumination device controller 5 repeats steps S1 and S2 until the ignition switch is turned off.

The following describes the luminance pattern with reference to FIGS. 5 to 8. The luminance pattern is stored in a memory unit (not shown). The luminance pattern of the light source 3 in the upper portion of FIGS. 5 to 8 is to be explained first. This light source 3 is referred to as "light source 3a" for convenience of explanation. FIG. 5 illustrates a state where the central light ray Lc of the light source 3a is reflected at an M2 surface's region that the longitudinal central line P3 of the needle body 6 intersects. In this state, the entire high-intensity region C of the light source 3a resides within the region A where loss of intensity due to reflection is not serious. In view of this, the luminance pattern stored in the memory unit is such that the luminance of the light source 3a is lowest when the indicating needle 2 is in the position illustrated in FIG. 5.

Figure 6:
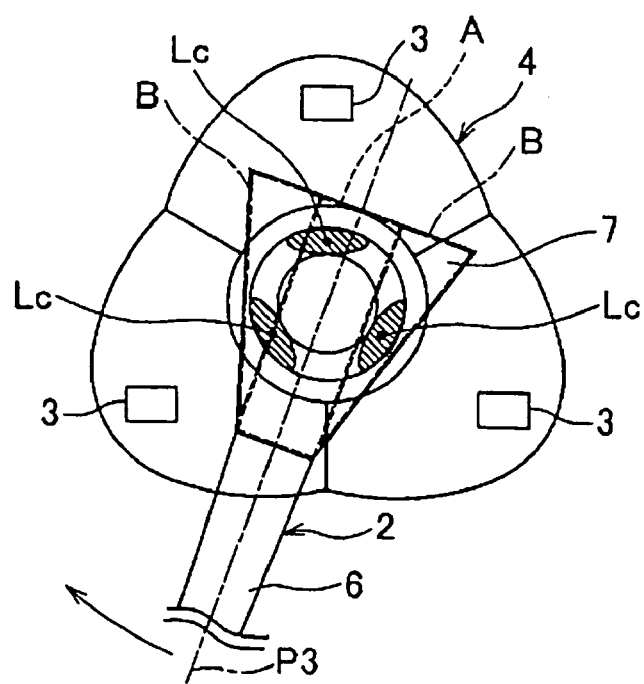
FIG. 6 schematically illustrates the luminance control performed by the illumination device controller illustrated in FIG. 4.
Figure 7:
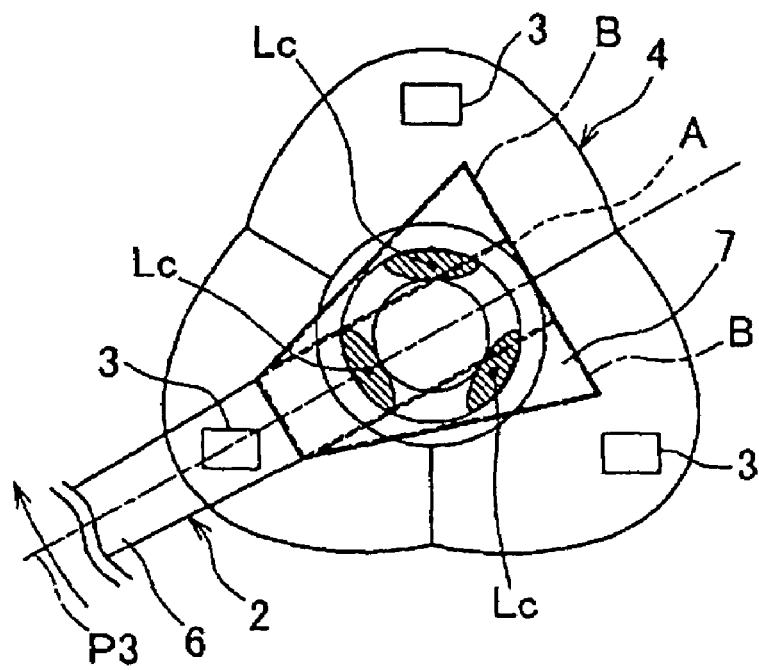
FIG. 7 schematically illustrates the luminance control performed by the illumination device controller illustrated in FIG. 4.

When the indicating needle 2 turns clockwise, as illustrated in FIGS. 6 and 7, the position of reflection of the central light ray Lc of the light source 3a on the M2 surface is taken out of and gradually moves away from the M2 surface's region with which the longitudinal central line P3 of the needle body 6 intersects. In response to the turning of the indicating needle 2, a portion of high-intensity region C of the light source 3a which still remains within the region A decreases in size. In contrast, a portion of the high-intensity region C of the light source 3a which now resides within the region B, which is a region where larger amount of loss in intensity occurs, increases in size. In accordance with what is illustrated in FIGS. 6 and 7, the luminance pattern stored in the memory unit is such that the luminance of the light source 3a gradually increases in response to the turning of the indicating needle 2, as the position of reflection of the central light ray Lc on the reflection surface M2 is taken out of and gradually moves away from the M2 surface's region with which the longitudinal central line P3 of the needle body 6 intersects.

When the indicating needle 2 further turns clockwise, the entire high-intensity region C of the light source 3a will reside within the region B. Accordingly, the luminance patterns stored in the memory unit ensures that the luminance of the light source 3a is largest when the entire high-intensity region C of the light source 3a remains within the region B.

When the indicating needle 2 turns even further in a clockwise direction, the position of reflection of the central light ray Lc of the light source 3a on the M2 surface gradually approaches the M2 surface's region that the longitudinal central line P3 of the needle body 6 intersects. In response to the turning of the indicating needle 2, a portion of the high-intensity region C of the light source 3a which falls within the region B decreases in size. In contrast, a portion of the high-intensity region C of the light source 3a which now resides within the region A increases in size. In view of this, the luminance pattern stored in the memory unit is such that the luminance of the light source 3a gradually decreases in response to the turning of the indicating needle 2, after departing from the state shown in FIGS. 7, and 8 as the position of reflection of the central light ray Lc of the light source 3a on the M2 surface again approaches the region that the longitudinal central line P3 of the needle body 6 intersects.

When the indicating needle 2 turns further in the clockwise direction, the central light ray Lc of the light source 3a are now reflected at the M2 surface's region that the longitudinal central line P3 of the needle body 6 intersects. Accordingly, the luminance pattern stored in the memory unit ensures that, again at this point, the luminance of the light source 3a is lowest. Thereafter, the above-described luminance pattern is repeatedly complied with in response to the turning of the indicating needle 2.

The following explains the luminance pattern of the light source 3 in the lower left portion of FIGS. 5 to 8. This light source 3 is referred to as "light source 3b" for convenience of explanation. In the state illustrated in FIG. 5, the high-intensity region C of the light source 3b enters almost entirely in the region B. In view of this, the luminance pattern stored in the memory unit is such that the luminance of the light source 3b is larger than the luminance of the light source 3a when the indicating needle 2 is in the position illustrated in FIG. 5.

When the indicating needle 2 turns in the clockwise direction, as illustrated in FIGS. 6 and 7, the position of reflection of the central light ray Lc of the light source 3b on the M2 surface approaches the region with which the longitudinal central line P3 of the needle body 6 intersects. In response to the turning of the indicating needle 2, a portion of the high-intensity region C of the light source 3b which remains within the region B decreases in size. In contrast, a portion of the high-intensity region C of the light source 3b which now resides within the region A increases in size. Accordingly, the luminance pattern stored in the memory unit is such that, as illustrated in FIGS. 6 and 7, in response to the turning of the indicating needle 2, the luminance of the light source 3b is gradually decreased as the state illustrated in FIG. 5 is exited and the position of reflection of the central light ray Lc of the light source 3b on the M2 surface gradually approaches the M2 surface's region which the longitudinal central line P3 of the needle body 6 intersects with.

When the indicating needle 2 turns further in the clockwise direction, as illustrated in FIG. 7, a state is entered where the central light ray Lc of the light source 3b is reflected at the M2 surface's region with which the longitudinal central line P3 of the needle body 6 intersects. At this point, the entire high-intensity region C of the light source 3b resides within the region A. Accordingly, the luminance pattern stored in the memory unit is such that the luminance of the light source 3b is lowest when the indicating needle 2 turns and, as a result, the indicating needle is in the position illustrated in FIG. 7.

When the indicating needle 2 turns even further in the clockwise direction, the position of reflection of the central light ray Lc of the light source 3b on the M2 surface is taken out of and moves away from the state where the position of reflection coincides with the region that the longitudinal central line P3 of the needle body 6 intersects. In response to the turning of the indicating needle 2, a portion of the high-intensity region C of the light source 3b that remains in the region A decreases in size. In contrast, a portion of the high-intensity region C of the light source 3b which now resides within the region B increases in size. In view of this, the luminance pattern stored in the memory unit is such that the luminance of the light source 3b is gradually increased in response to the turning of the indicating needle 2 after exit from the state illustrated in FIG. 7 where the position of reflection of the central light ray Lc of the light source 3b on the M2 surface coincides with the region which the longitudinal central line P3 of the needle body 6 intersects with.

When the indicating needle 2 turns further in the clockwise direction, the entire high-intensity region C of the light source 3b is found in the region B. In this manner, the luminance pattern stored in the memory unit ensures that the luminance of the light source 3b is highest when the entire high-intensity region C of the light source 3b resides within the region B. Thereafter, the luminance pattern is repeatedly complied with in response to the turning of the indicating needle 2.

The following describes the luminance pattern of the light source 3 in the lower right portion of the figure. This light source 3 is referred to as "light source 3c" for convenience of explanation. In the state shown in FIG. 5, the high-intensity region C of the light source 3c is found almost entirely within the region B. The luminance pattern stored in the memory unit is such that the luminance of the light source 3c is larger than that of the light source 3a when the indicating needle 2 is in the position illustrated in FIG. 5.

When the indicating needle 2 turns in the clockwise direction, as illustrated in FIG. 6, the entire high-intensity region C of the light source 3c is placed within the region B. In this manner, the luminance pattern stored in the memory unit is such that the luminance of the light source 3c is highest when the entire high-intensity region C of the light source 3c rests within the region B.

Figure 8:
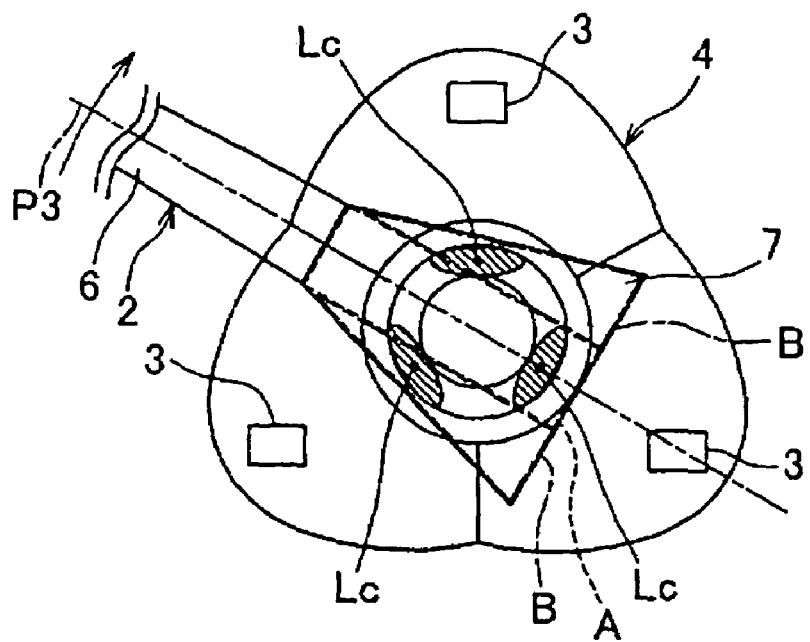
FIG. 8 schematically illustrates the luminance control performed by the illumination device controller illustrated in FIG. 4.

When the indicating needle 2 turns further in the clockwise direction, as illustrated in FIGS. 7 and 8, the position of reflection of the central light ray Lc of the light source 3c on the M2 surface gradually approaches the M2 surface's region which the longitudinal central line P3 of the needle body 6 intersects with. Thus, a portion of the high-intensity region C of the light source 3c which remains within the high-reflection-loss region B decreases in size in response to the turning of the indicating needle 2. In contrast, a portion of the high-intensity region C of the light source 3c which resides within the region A increases in size. In view of this, the luminance pattern stored in the memory unit is such that the luminance of the light source 3c gradually decreases in response to the turning of the indicating needle 2 after the state illustrated in FIG. 6 has been exited, as the position of reflection of the central light ray Lc of the light source 3c on the M2 surface approaches the M2 surface's region with which the longitudinal central line P3 of the needle body 6 intersects.

When the indicating needle 2 turns even further in the clockwise direction as shown in FIG. 8, the central light ray Lc of the light source 3c is reflected off the M2 surface's region that the longitudinal central line P3 of the needle body 6 intersects. In this state, the entire high-intensity region C of the light source 3c rests within the region A. In view of this, the luminance pattern stored in the memory unit is such that the luminance of the light source 3c is lowest when the indicating needle 2 is in the state illustrated in FIG. 8.

When the indicating needle 2 turns further in the clockwise direction, the position of reflection of the central light ray Lc of the light source 3c on the M2 surface is taken out of and moves away from the region with which the longitudinal central line P3 of the needle body 6 intersects. In response to the turning of the indicating needle 2, a portion of the high-intensity region C of the light source 3c which remains within the region A decreases in size. In contrast, a portion of the high-intensity region C of the light source 3c that resides in the region B increases in size. Accordingly, the luminance pattern stored in the memory unit ensures that the luminance of the light source 3c gradually increases in response to the turning of the indicating needle 2 after the state illustrated in FIG. 8 has been exited as the position of reflection of the central light ray Lc of the light source 3c on the M2 surface gradually moves away from the M2 surface's region with which the longitudinal central line P3 of the needle body 6 intersects.

When the indicating needle 2 turns even further in the clockwise direction, again, the entire high-intensity region C of the light source 3c is placed within the region B. In this manner, the luminance pattern stored in the memory unit is such that the luminance of the light source 3c is highest when the entire high-intensity region C of the light source 3c rests in the region B. Thereafter, the luminance pattern is repeatedly complied with in response to the turning of the indicating needle 2.

It should be noted that the relative positions of the central light ray Lc with respect to regions A and B depending upon the turning of the above indicating needle 2 may vary according to the configurations of the light-guiding member 4 and the reflection surface M2. Consequently, the luminance, a control range of the luminance, and/or a range of variations in the luminance of each light source 3 may also differ, and therefore it is also possible that the luminance is only variable for the one specific light source 3 among the plurality of the light sources 3.

In the illumination device 1 for an indicating needle according to the above-described embodiment, the illumination device controller 5 controls the luminance of the light sources 3 in response to the turning of the indicating needle 2 in such a manner that the luminance is lowest when the central light ray Lc of the light sources 3 is reflected at the M2 surface's region that the longitudinal central line P3 of the needle body 6 intersects, and the luminance gradually increases as the position of reflection of the central light ray Lc of the light source 3 on the M2 surface moves away from the region with which the longitudinal central line P3 of the needle body 6 intersects. Accordingly, the amount of light from the light source 3 and incident on the region A, which is not seriously affected by losses in intensity due to the reflection surface M2, can be kept constant regardless of the turning of the indicating needle 2 and the actual position thereof, thus reducing the variations in brightness of the indicating needle 2 while turning, and ensuring improved visibility and improved external appearance foe example of a combination meter for an automobile with such illumination features.

According to the above-described embodiment, the shape of the light-guiding member 4 is approximately cylindrical such that its circumference is gradually increased from the side of the indicating needle 2 toward the light source 3. However, the light-guiding member 4 may take other shapes as long as the light rays emitted by the light sources 3 can be effectively guided to the entrance surface M3 of the indicating needle 2. For example, it can take a simple cylindrical shape.

According to the above-described embodiment, the light-guiding member 4 is provided between the light source 3 and the indicating needle 2. However, it may also be possible to let the light rays L emitted by the light sources 3 directly go inside of the indicating needle 2 without being guided by the light-guiding member 4.

Also, in the above embodiment, the luminance of the light source 3 is controlled by changing the duty ratio of the pulsed power supply that supplies power to the light source 3. However, this does not exclude other approaches. For example, the luminance of the light source 3 may be controlled by changing a current value for the light source 3.

Having now fully described the device according to the preferred embodiment of the present invention, it is clear that the foregoing is illustrative of the present invention and is not to be construed as limiting the invention. Those skilled in this art will readily effectuate possible modifications and variations without materially departing from the spirit and scope of the present invention.

What is claimed is:

1. An illumination device for an indicating needle comprising:

an indicating needle that includes a rod-shaped needle body configured to indicate an indication and a needle base whose width is larger than a width of the needle body, the needle base having an entrance surface via which a light enters an inside of the needle base and a reflection surface by which the light entering the inside of the needle base via the entrance surface is reflected toward the needle body;

a position detecting means for detecting a position of the needle;

a plurality of light sources each configured to emit the light entering the inside of the needle base via the entrance surface thereof and arranged such that the light sources encircle a driving shaft of the indicating needle; and a luminance control means for controlling luminance of the plurality of light sources in response to a detected position of the indicating needle such that the luminance is lowest when the light emitted by the light source from a center of an emitting surface thereof is reflected off a region of the reflection surface that a longitudinal central line of the needle body intersects, and the luminance becomes higher when a point of reflection of the light emitted by the light source from the center of the emitting surface thereof on the reflection surface becomes more distant from the region of the reflection surface that the longitudinal central line of the needle body intersects.

2. A method for illuminating an indicating needle in a meter for a vehicle comprising the steps of:

detecting a position of the needle; and controlling luminance produced by each of a plurality of light sources for the needle which are arranged in a pattern encircling a driving shaft of the needle according to the detected needle position.

3. The method for illuminating an indicating needle as recited in claim 2, wherein the luminance produced by each of the plurality of light sources is controlled by controlling the duty cycle of a pulsed power supply for each of the plurality of light sources.

* * * * *